(12) United States Patent
Oakley

(10) Patent No.: US 6,545,968 B1
(45) Date of Patent: *Apr. 8, 2003

(54) GENERATING A TWO DIMENSIONAL ARRAY OF MODULATED LIGHT BEAMS BY A HOLOGRAPHIC BEAM SPLITTER

(75) Inventor: William S. Oakley, San Jose, CA (US)

(73) Assignee: Lots Technology, Inc., Longmont, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/183,608

(22) Filed: Jan. 18, 1994

(51) Int. Cl.[7] .................................................. G11B 7/00
(52) U.S. Cl. .................. 369/95; 369/112.1; 369/124.03
(58) Field of Search .................................. 369/103, 109, 369/110, 102, 112.26, 93, 109.01, 44.38, 110.02, 112.1, 124.03, 112.15, 95; 365/127, 125; 359/22, 559, 900, 569, 3, 10, 21, 26, 7; 356/28.5

(56) References Cited

U.S. PATENT DOCUMENTS

| | | | |
|---|---|---|---|
| 3,744,910 A | | 7/1973 | van Deelen ................ 356/28.5 |
| 3,812,496 A | * | 5/1974 | Brooks .................. 369/109.01 |
| 4,012,108 A | * | 3/1977 | Ishii et al. ................... 369/103 |
| 4,298,974 A | * | 11/1981 | Tsunoda et al. ............ 369/111 |
| 4,458,980 A | * | 7/1984 | Ohki et al. ................. 369/103 |
| 4,550,395 A | * | 10/1985 | Carlson ..................... 369/103 |
| 4,978,950 A | * | 12/1990 | Capps ........................ 369/116 |
| 5,113,286 A | | 5/1992 | Morrison ..................... 359/569 |
| 5,121,231 A | * | 6/1992 | Jenkins et al. .................. 359/7 |
| 5,619,488 A | | 4/1997 | Ota et al. ............... 369/112.26 |

FOREIGN PATENT DOCUMENTS

| | | |
|---|---|---|
| EP | 0 491 458 A1 | 6/1992 |
| WO | WO 95/05944 | 3/1995 |

OTHER PUBLICATIONS

Feldman et al., *Iterative Encoding of High–Efficiency Holograms for Generation of Spot Arrays,* Optics Letters, Optical Society of America, Washington D.C., May 15, 1989, vol. 14, No. 10, pp. 479–481.

Watabe et al., *Multi–Beam Read–Verifying Optical Head for Parallel Recording,* Japanese Journal of Applied Physics Part 1, Nov. 1993, vol. 32, No. 11B, pp. 5406–5410.

* cited by examiner

*Primary Examiner*—William Korzuch
*Assistant Examiner*—Kim-Kwok Chu
(74) *Attorney, Agent, or Firm*—Blakely, Sokoloff, Taylor & Zafman LLP

(57) ABSTRACT

An apparatus for generating a two dimensional array of modulated light beams. A laser and a collimator are used to generate a single collimated light beam. This collimated light beam is passed through a two dimensional holographic beam splitter. Thereupon, the holographic beam splitter produces a two dimensional divergent array of diffraction limited collimated light beams. These light beams are then independently modulated by a two dimensional modulator array.

45 Claims, 7 Drawing Sheets

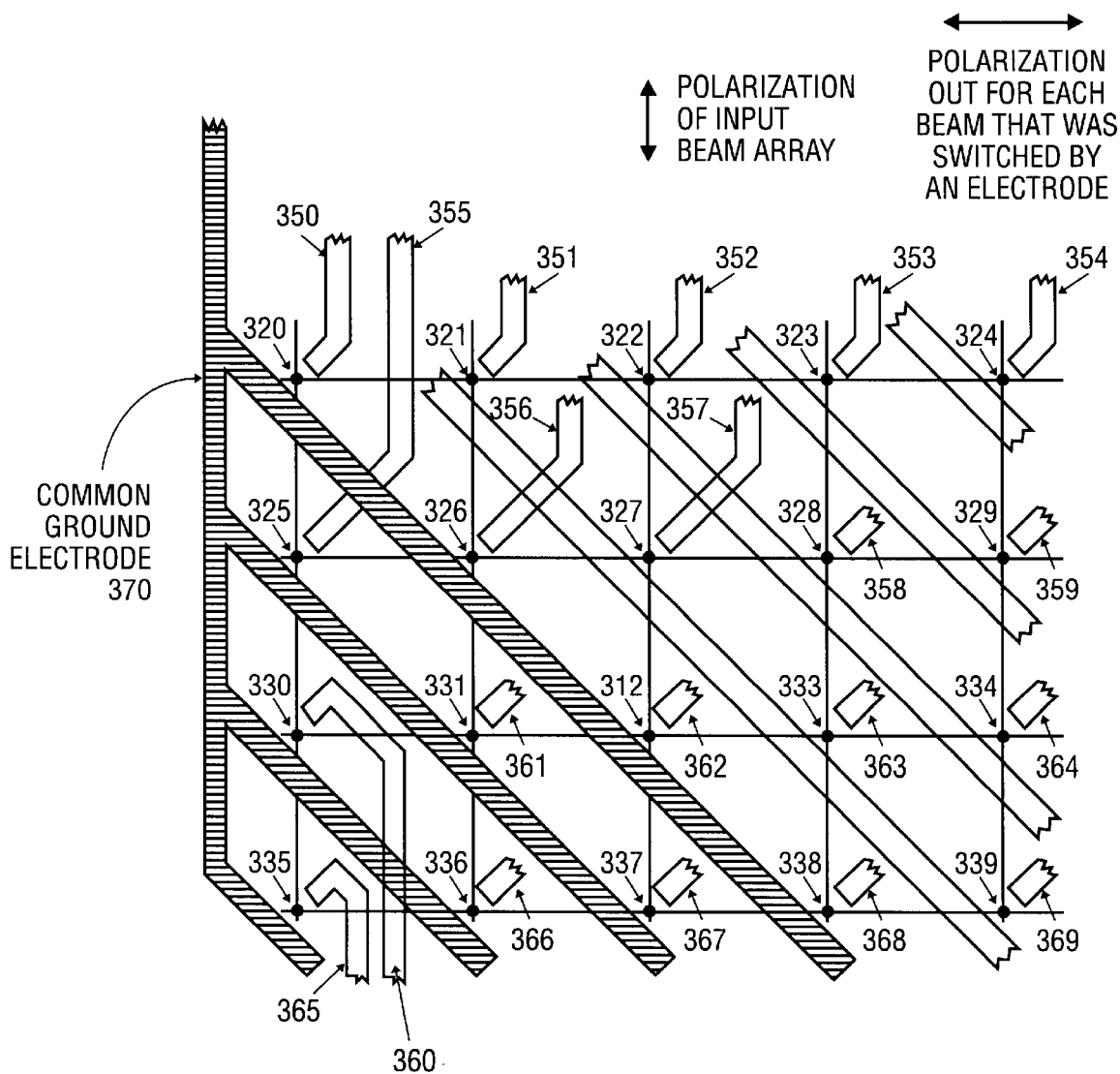

GENERATING A TWO DIMENSIONAL ARRAY OF MODULATED LIGHT BEAMS BY A HOLOGRAPHIC BEAM SPLITTER

FIELD OF THE INVENTION

The present invention pertains to the field of two-dimensional spatial light modulation.

BACKGROUND OF THE INVENTION

Optics is playing a greater and wider role in the fields of electronics, telecommunications, signal processing, and data storage. Light beams are preferable over electrical signals because of their high bandwidth and propagation speed. Rather than using conventional electrical signals, optical based systems employ light beams to convey and process information. In optical based systems, a light source, such as a laser, is modulated to convey the desired information. By implementing digital or analog modulation, the light beam can be used in a wide variety of different applications. Chief among these applications has been the generation of visual displays, optical signal processing, optical digital computing, laser printing, and storage of digital information, etc.

Although lasers can be modulated at rather high frequencies, many applications require even higher data rates. In an effort to increase the data rate, some prior art optical systems have implemented multiple light beams. By processing these multiple light beams in parallel, the overall speed of the system can dramatically be enhanced. And depending on the particular application, the number of light beams can range from tens to perhaps several thousands.

The disadvantage to utilizing multiple light beams is that a separate light source was typically required to generate each of these beams. Not only do these additional generators significantly increase the cost, but they also impact the reliability of the overall system. Moreover, these multiple generators increases the size of the packaging several fold.

Furthermore, prior art light modulation schemes have typically concentrated on the number of modulator array elements, rather than the element or total array modulation rate. Not that waveguide and PLZT ceramic devices operate only in transverse mode, whereas pockels effect devices operate in either transverse or longitudinal modes.

Thus, there is a need in the art for a light beam multiplication apparatus and method, whereby a single or a few light sources can be used to effectively create multiple light beams, each independently modulatable. It would also be preferable if such an apparatus and method could achieve a high throughput rate by implementing a fast, electrically driven modulator element array, comprised of a multiplicity of part independent modulators through each of which passes a single light-beam. It is further most beneficial if each throughput light-beam is diffraction limited.

SUMMARY OF THE INVENTION

The present invention pertains to an apparatus and method for generating a two dimensional array of diffraction limited modulated light beams for use in optical fiber telecommunications, optical signal processing, optical digital computing, laser printing, optical recording, etc. Basically, a laser diode and a collimator are used to generate a single collimated light beam. This collimated light beam is passed through a two dimensional holographic beam splitter. Thereupon, the holographic beam splitter produces a two dimensional divergent array of diffraction limited collimated light beams. These light beams are then independently modulated by a matched two dimensional array of electrooptic modulator elements to produce a two dimensional array of modulated light beams. The modulator array can be comprised of discrete micro optical Pockels modulators, waveguide structures, or an array of ferroelectric modulators using either bulk materials or a thin film layer deposited on a substrate. The resulting two dimensional array of modulated light beams can then be sent on to a recording medium or to an input plane to a next process.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3C shows a modulator which can be used in one embodiment of the present invention.

DETAILED DESCRIPTION

An apparatus and method for a two-dimensional array of modulatable light sources is described. In the following description, for purposes of explanation, numerous specific details are set forth, such as operating frequencies, array sizes, apertures, spacings, etc., in order to provide a thorough understanding of the present invention. It will be obvious, however, to one skilled in the art that the present invention may be practiced without these specific details. In other instances, well-known structures and devices are shown in block diagram form in order to avoid unnecessarily obscuring the present invention.

Figure 1:
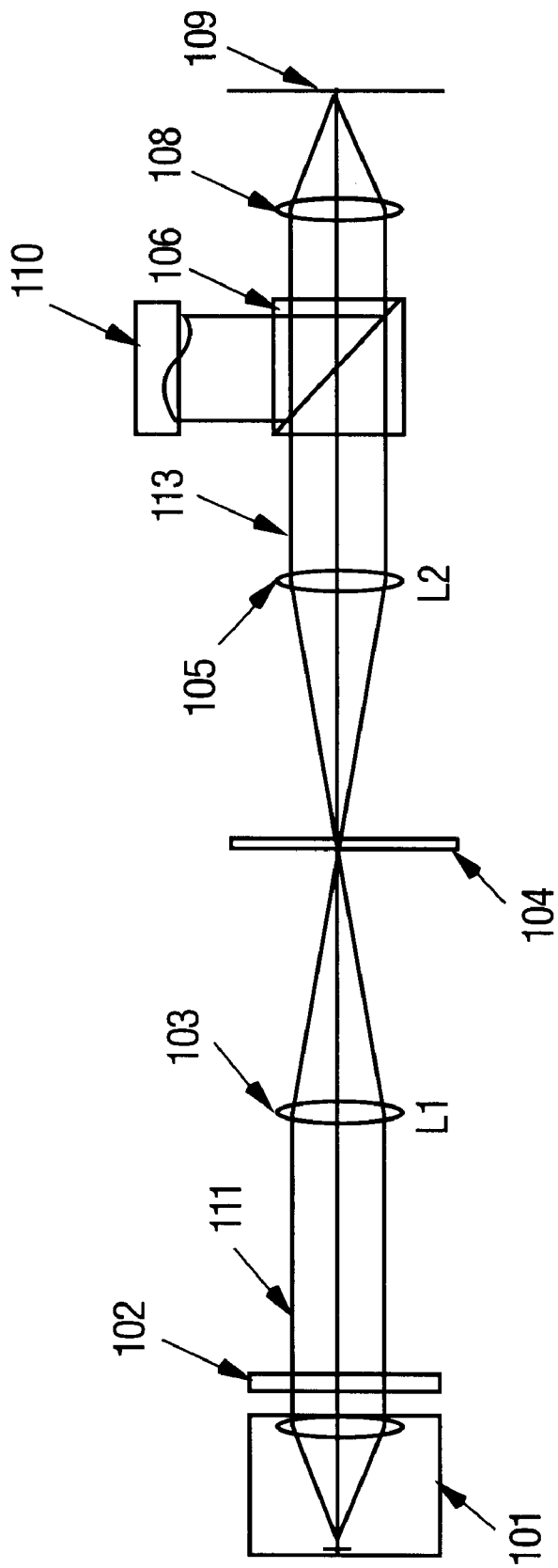
FIG. 1 shows a diagram of a system configuration upon which the currently preferred embodiment of the present invention may be practiced.

Optical System Configuration of Two-Dimensional Array of Modulatable Light Sources Referring to FIG. 1, a diagram of a system configuration upon which the currently preferred embodiment of the present invention may be practiced is shown. A collimated light beam 100 is generated by a light source 101 (e.g., laser diode and collimating lens). A holographic two-dimensional array beam splitter 102 is used to separate the collimated light beam 100 into a two dimensional divergent array of diffraction limited collimated beams 111. In the currently preferred embodiment, the individual beams produced by hologram 102 are of nominally equal intensity. The nature of the holographic splitter 102 requires that an odd number of beams be generated in each axis. Hence, the size of the array can range from a 3×3 array to upwards of thousands of individual beams. The upper size of the array is limited either by the laser power available for the chosen application or by the field of the optical system. Smaller arrays are well suited to digital optical recording on a disc or tape media, while larger arrays are applicable to optical signal processing, digital computing, and fiber optic communications. These larger arrays are better suited to applications which are less laser power limited than those for data storage.

As an example, an array of 128×128 elements, with each element operating at 100 MHz, provides optical data manipulation at a total data rate of over 1.5 THz. In the currently preferred embodiment, a two-dimensional array of 9×9 beams are implemented. In other embodiments, NxM beams (e.g., 5×7, 7×7, 7×9, 7×13, 9×9, 3×11, etc.) can be used to provide the total number of beams desired (e.g., 35, 49, 63, 81, 99, 33, etc.).

Each of the individual beams of beam array 111 is then passed through an element of a two-dimensional array of modulators 104. Each beam is modulated separately by one of the modulation elements of the modulator array 104. A variety of different techniques can be used to independently modulate each of the separate beams of beam array 111. For example, modulator array 104 can consist of discrete elements or waveguides. Thereby, the combination of the two-dimensional holographic beam splitter 102 and modulator array 104, from a means of generating a two-dimensional array of modulatable optical beams.

It should be noted that both digital as well as analog modulation schemes are applicable to the present invention. Furthermore, different modulation schemes (e.g., phase, amplitude, and frequency modulation) can be implemented by the present invention. Amplitude modulation is frequently used in optical data recording, while phase modulation is used in optical computing and signal processing applications.

The common aperture associated with standard optical components designed for use with laser diodes is approximately 4.3 millimeters. To maintain beam integrity after diffraction from hologram 102, the grating period should be such that approximately 17 grating cycles exist across the optical beam. This implies a maximum grating spacing of approximately 0.25 millimeters. For a laser source of a given wavelength (e.g., a laser diode at 0.83 microns), the interbeam angle after diffraction is given by the ratio of the wavelength/grating spacing. For the specifications described above, this results in an interbeam angle of 3.33 milliradians. Holograms capable of meeting this requirement can be fabricated by using electron beam etching of metallic deposits on quartz or glass substrates. Such holograms are available from optics manufacturers, such as Lasiris Inc. or Quebec, Canada. These holograms can be obtained in sizes up to 25 millimeter in diameter.

The two-dimensional array of collimated beams 100 generated by hologram 102 are focused in the middle of an optical relay system comprised of relay lenses 103 and 105. The relay lens 103 forms a two dimensional focal plane array of parallel focused beams having a moderate "f" number. The modulator array 104 is placed in this focal plane and is aligned with the holographically formed beam array, thereby enabling all the beams to be individually modulated.

The optical relay system uses 10 millimeter focal length doublets comprising of relay lenses 103 and 105. This arrangement produces diffraction limited performance. Spacing of the first relay lens 103 one focal length away from the hologram 102 and one focal length away from the modulator focal plane, provides a parallel array of focused beams in the focal plane. This facilitates the modulator design and fabrication. A symmetrical relay system is utilized; the second relay lens 105 is placed one focal length from the modulator array 104. This forms a convergent array of collimated beams which results in a pupil.

Figure 2:
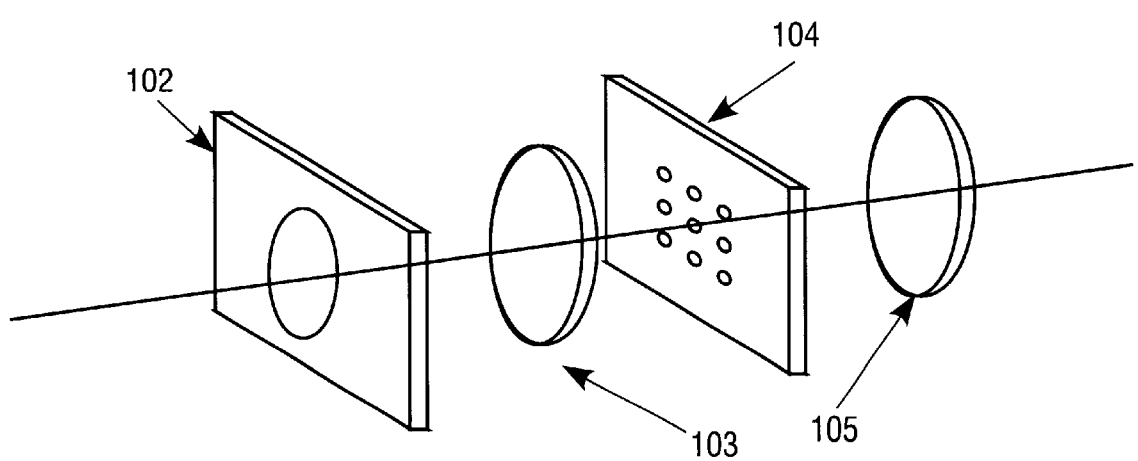
FIG. 2 shows the system modulator configuration of the currently preferred embodiment.

FIG. 2 shows the system modulator configuration of the currently preferred embodiment. The collimated light source is sent through the two-dimensional, computer generated hologram 102. The beam array then passes through the first relay lens 103 and focused onto the two-dimensional modulator array 104. The modulated beam array is then sent through the second relay lens 105 and ultimately onto the recording media or to an input plane to the next process.

A polarizing beamsplitter 106 can be placed at the pupil location to sample the modulated beam. Only those beams having the correct polarization are passed to the media 109. In this manner, the beams can be modulated to produce a digital stream of 1's and 0's. A third lens 108 can be used to refocus the beams onto a recording media or input plane to a next process 109. In one embodiment (e.g., for reading optical recordings), light beams reflected back through a quarter wave plate 107 and polarized beam splitter 106 are directed to a detector 110.

The focal length of the third lens 108 is chosen according to the particular application being implemented. For example, lens 108 is selected to provide the beam convergence parameters necessary to match that of the optical fiber being used in telecommunication applications. For optical digital computing applications, the relay and modulator combination described in detail above can be successively repeated to provide the desired processing. Intermittent beam sampling as provided by the polarized beam splitter 106 allows output from the system at chosen points to be used as input to other modulator elements (not shown in FIG. 1), located elsewhere in the system. In a data recording implementation, lens 108 is selected to form the recording beams onto the recording media 109, as in FIG. 1. In this manner, electronically controlled optical computing is performed.

Two-Dimensional Electrootztic Modulator Array

The two-dimensional electrooptic modulator array is constructed so as to operate one each beam element separately. In one embodiment, the two-dimensional modulator array is comprised of electrooptic "Pockels" modulators constructed as a series of wafers. Pockel modulation is described in *Handbook of Optics*, Optical Society of America. The Pockels type modulator can be comprised of crystalline KDP, $BaTiO_3$, or $LiTaO_3$ materials. Lithium Tantalate, being an electrooptic material of good optical quality, can be used for the modulator. This crystal requires a half wave voltage of approximately 3,600 volts for operation, using a cube of appropriately oriented and polished material. This voltage can be considerably reduced by increasing the aspect ratio (i.e., length/height) of the modulator. For example, a crystal aspect ratio of 60 is selected, thereby reducing the required voltage to approximately 60 volts. The crystal aspect ratio and the crystal optical index of 2.15 at the 0.83 micron wavelength, limit the throughput optical beam to an f number of f/14. This places a lower limit on the relay lens focal length of 60 millimeters, as a result of the 4.33 millimeter beam diameter of the system.

For a 60 millimeter focal length relay and an interbeam angle of 3.33 milliradians, the focal region of each beam is separated from its nearest neighbors by a distance of 200 microns. Given an electrode pattern to space ratio of 1:1, the electro-optic active zone is 100 microns square and requires a commensurate crystal thickness of approximately 0.004 inches. Thus, the required crystal length is sixty times greater (i.e., 6.0 mm), and the active crystal size for a 9×9 array is 0.1×2×6.0 mm. Each crystal plane allows modulation of nine beams. Nine such planes forming a square array is required. The separation between crystal plane centers is 200 microns.

This modulator array can be fabricated, wherein each crystal plane is electroded and then sandwiched between two inactive wafers of the same optical index as the crystal (e.g., high index glass). The electrode connections are run out on both sides of the array and form electrical connections at the edges of the assembly. The optical faces of the nineteen (i.e., nine active and ten insulating) layer assembly are polished after stacking to reduce the possibility of edge chipping during the final optical polishing operation.

It is also possible to fabricate a two-dimensional array of electrooptic waveguide modulators to essentially the same dimensions described above. The use of waveguide devices generally provides higher modulation rates at a lower drive voltage. The waveguide array can replace the discrete modulator array in an identical optical system. However, the tolerances associated with the placement of the waveguide array is critical.

In a second, currently preferred embodiment, the two-dimensional array of modulators is implemented using an electrode structure deposited onto a wafer or thin deposited layer of electrooptic ferroelectric ceramic, such as PLZT. A layer of such material is deposited on an optical substrate by means of chemical vapor deposition or Sol Gel processes. It is then appropriately electroded to provide a modulatable transverse electric field is the PLZT layer. This electric field is located in the region of transmission of each individual beam.

Figure 3A:
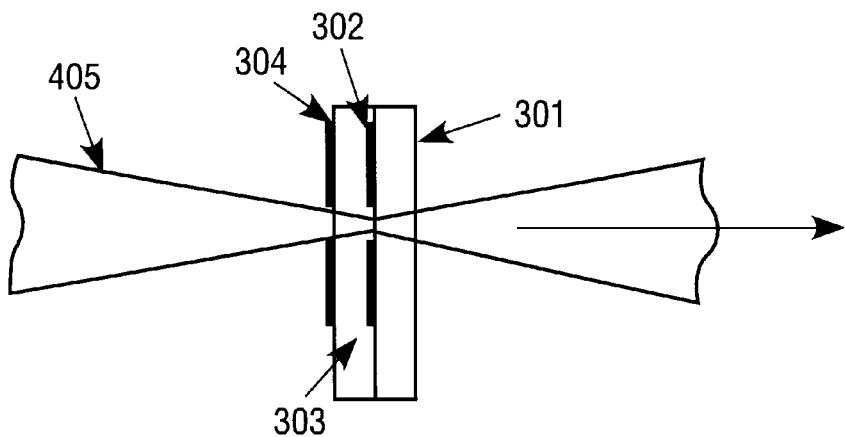
FIG. 3A shows one element of a transmissive modulator array having a longitudinal field.

FIG. 3A shows one element of a transmissive modulator array having a transverse field. The element is comprised of an optical substrate 301, a ground electrode 302, a thin film PLZT 303, and a front electrode 304. The optical beam 305 is passed through and modulated by this element.

Figure 3B:
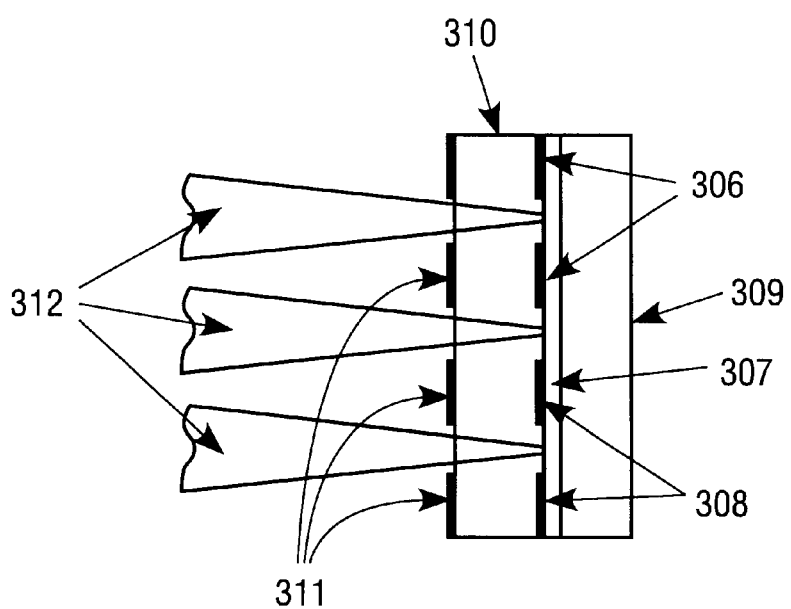
FIG. 3B shows several elements of a reflective modulator array having a longitudinal field.

FIG. 3B shows several elements of a reflective modulator array having a transverse field. This configuration is comprised of a two-dimensional array of electrodes, such as electrodes 306–308. These electrodes are sandwiched between the substrate 309, and the thin film PLZT 310. The PLZT is sandwiched between electrodes 306–308 and the ground electrode 311. The input beam is modulated by the electric field in the PLZT, hits the reflective layer 307 and reflected back. Hence, beam 312 is both input and output.

If a 10 millimeter focal length relay is provided, the system f/# is 10/4.3 or f/2.33, and the spot size in the modulator plane for an 8.3 micron wavelength source is 4.71 microns diameter. The separation between beams is 10 mm×3.33 microns (i.e., 33.3 microns) in both directions across the wafer. The drive voltage required for modulation using a transverse field configuration is nominally 2 volts per micron. This means that, given a five micron aperture, a 10 volt drive is required.

FIG. 3C shows a modulator which can be used in one embodiment of the present invention. A 4×5 beam array is shown. Beams 320–339 of the beam array are input having one given polarization. The drive electrodes 350–369 are used in conjunction with the common ground electrode 370 to control the polarity of each of the beams 320–340 individually. Applying voltage to a particular drive electrode causes the corresponding input beam to switch its polarity. For example, applying a voltage to drive electrode 350 causes beam 320 to change its polarity. Hence, each of the beams can individually be modulated by selectively applying voltage to the appropriate drive electrodes.

Figure 3D:
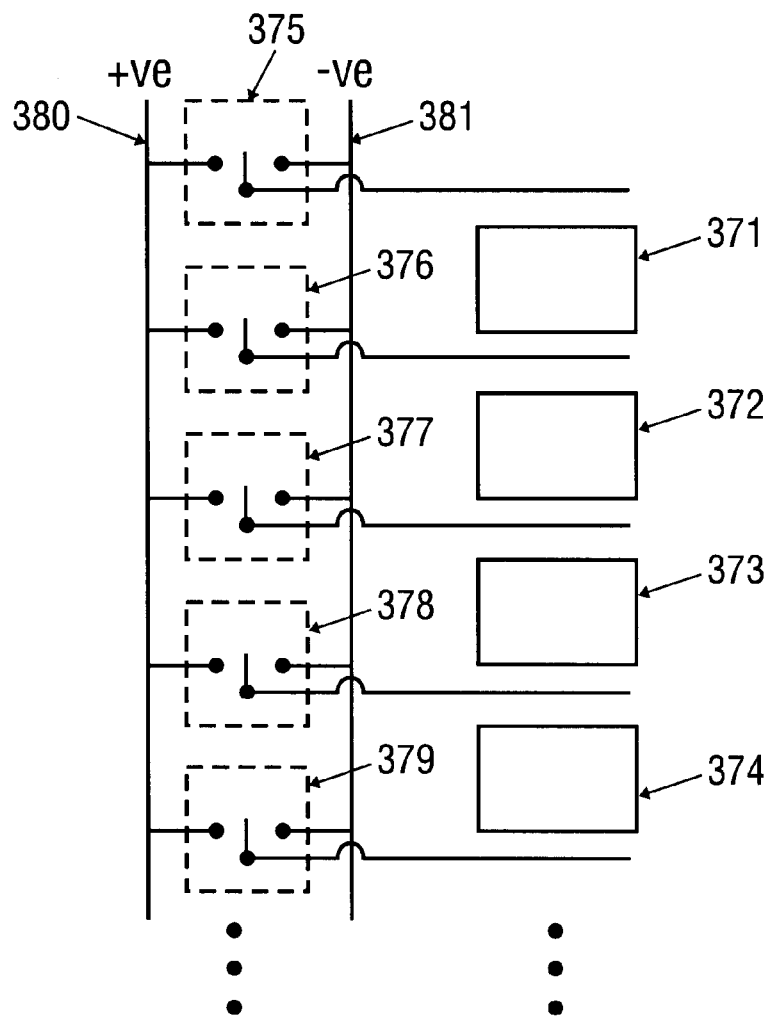
FIG. 3D shows a binary alternating voltage drive for a line of array modulators which can be used in another embodiment of the present invention.

FIG. 3D shows a binary alternating voltage drive for a line of array modulators which can be used in another embodiment of the present invention. Modulator elements are used to control the polarity of particular beams. For example, modulator elements 371–374 are used to control the polarity of four separate beams. In turn, these modulator elements are controlled according to the voltage applied across them. The voltage across a particular modulator element depends on the position of a switch corresponding to a prior modulator element and of a switch corresponding to that particular modulator element. When these switches conduct the same voltage, that particular modulator is turned off. And when these switches conduct opposites or different voltages, that particular modulator is turned on. In other words, a particular modulator element can be turned on or off by controlling its corresponding switch to apply the same or opposite voltage relative to the voltage being conducted by the switch corresponding to the prior modulator element.

For example, switches 375–379 control whether modulator elements 371–374 are turned on or off. More specifically, switches 375 and 376 control the voltage applied across modulator element 371, which determines whether modulator element is on or off. If switch 375 is switched to the +ve line 380 and switch 376 is switched to the -ve line 381 (or vice versa), modulator element 371 is turned on. Otherwise, modulator element 371 is turned off. Table 1 below is a truth table showing the states of a modulator element with respect to the switch positions.

| Switch 1 | Switch 2 | State of Modulator Element |
| --- | --- | --- |
| +ve | +ve | off |
| +ve | −ve | on |
| −ve | +ve | on |
| −ve | −ve | off |

Optical Recording Systems

An example as to how the present invention can be applied to optical recording systems is now described in detail below and in reference back to FIG. 1. An important attribute of data storage systems is the rate at which data can be written to or read from the storage media. The data rate is significantly increased by implementing multiple parallel optical beams. This is accomplished by implementing the two-dimensional sparse array of individually modulatable beams to produce a multiplicity of optical read/write beams which are oriented to produce a closely packed array of data tracks on the moving recording media. Movement of the media under the focused array of spots enables the desired track pattern to be written.

In the currently preferred embodiment, the hologram is rotated to an angle, such that a sparse array of beams in the modulator writes closely packed tracks onto the media. This is accomplished by using a two-dimensional beam array and rotating the array through a small angle. Each column of nine beams of a square array rotated through an angle of $\tan^{-1}(1/9)$, or approximately 6.3 degrees from parallel to the direction of media movement, produces nine closely spaced tracks on the media over a width of 1.6×9, or approximately 14.4 microns. This pattern is replicated across the hologram by the number of columns in the array. Hence, a nine by N array replicates the nine tracks N time, thereby producing 9×N tracks. Note that the increased physical separation of the beams due to the sparse array minimizes channel crosstalk effects on writing and reading operations, both in the system hardware and due to media bit proximity effects.

Figure 4A:
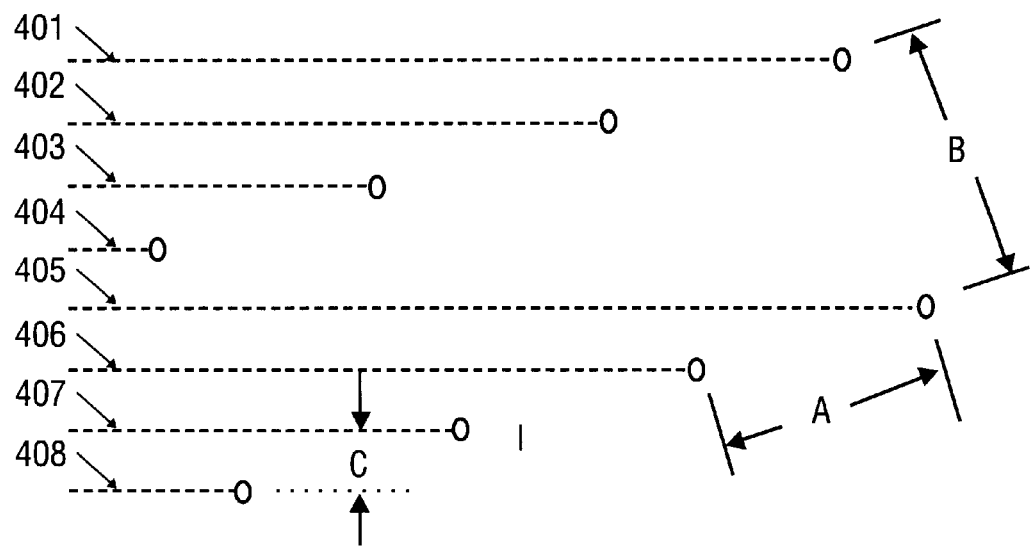
FIG. 4A shows an example of a close track generation in an optical tape recorder using a sparse 2×4 array of modulated beams.
Figure 4B:
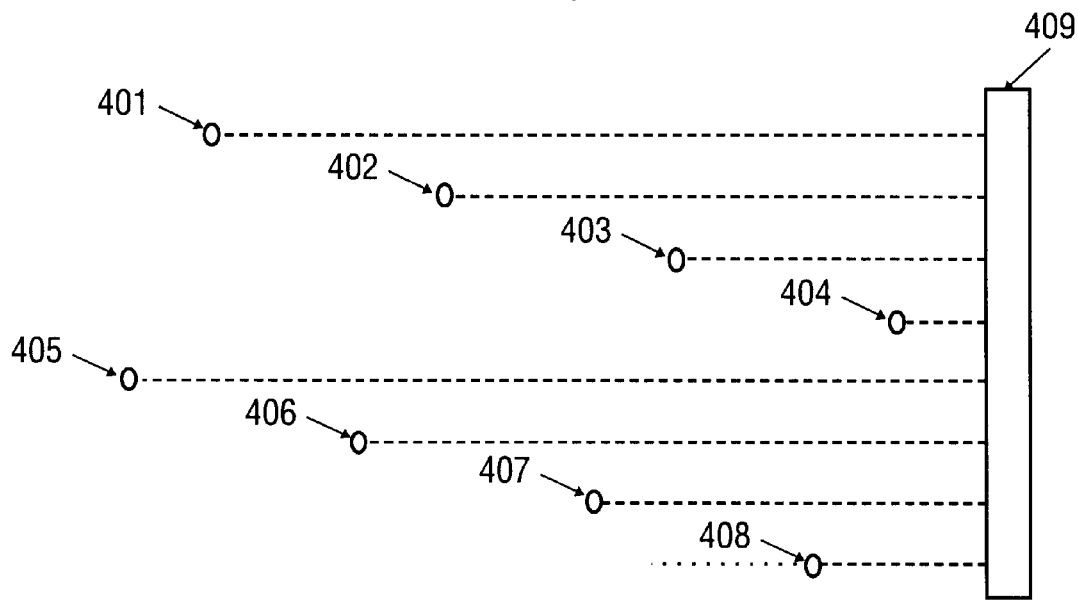
FIG. 4B shows a 2×4 array for generating eight beam's used to write to a tape.

FIG. 4A shows an example of a close track generation using a sparse 2×4 array. The 2×4 array produces eight separate beams 401–408. Each of these beams produces a separate track. Hence, the 2×4 array results in the simultaneous generation of eight different tracks as the media (e.g., tape or disk) moves from right to left. Note that the sparse beam spacing (A, B) is much greater than the track spacing C. This effect is due to the angular rotation of the hologram discussed in detail above. FIG. 4B shows the 2×4 array for generating the eight beams 401–408 used to write to tape 409.

In optical disk systems, the polarizing beamsplitter 106 and the quarterwave plate 107 enable an illuminated area on the media 109 to reflect data back to the detection system 110 for bit readout, focus, and tracking. The dynamic focusing objective 108 is an f/1 lens having an aperture of approximately 4.3 millimeters. Such a lens assembly, called an FMA, can be obtained from Most Manufacturing, Inc. of Colorado.

Utilizing a 4.3 millimeter focal length objective lens (f/1), results in the desired focused spot size of approximately 1 micron, and gives a recorded track spacing on media 109 of 1.6 microns. The angle between each of the beams of the modulated beam array is selected to result in the desired track separation on the recording media 109. In the currently preferred embodiment, the interbeam angle is nominally 1.6/4.3 or 0.372 milliradians. The interbeam angle exiting the hologram 102 and that desired to produce the individual track spacing, is 9×0.372 or approximately by a factor of 3.33 mrad. In other words, the beam angle produced is nine times greater than the desired track spacing on the media.

The maximum number of nine element track groups that can be spaced across the media is given by the extent of the holographic array in the other axis. This is limited by the ability of the final objective lens to focus the beams. A lens of 1.8 degrees field (i.e., approximately 30 milliradians), allows nine equally spaced groups with an intergroup angle of 3.33 milliradians. Thus, such a system can accommodate a 9×9 array and still produce eighty-one parallel tracks on the media across a region of approximately 130 microns. For an array to pass through a lens, the lens field should exceed the array diagonal. For the square array given above, the lens field should be 1.414 times larger (i.e., 185 microns and 2.5 degrees).

Figure 5:
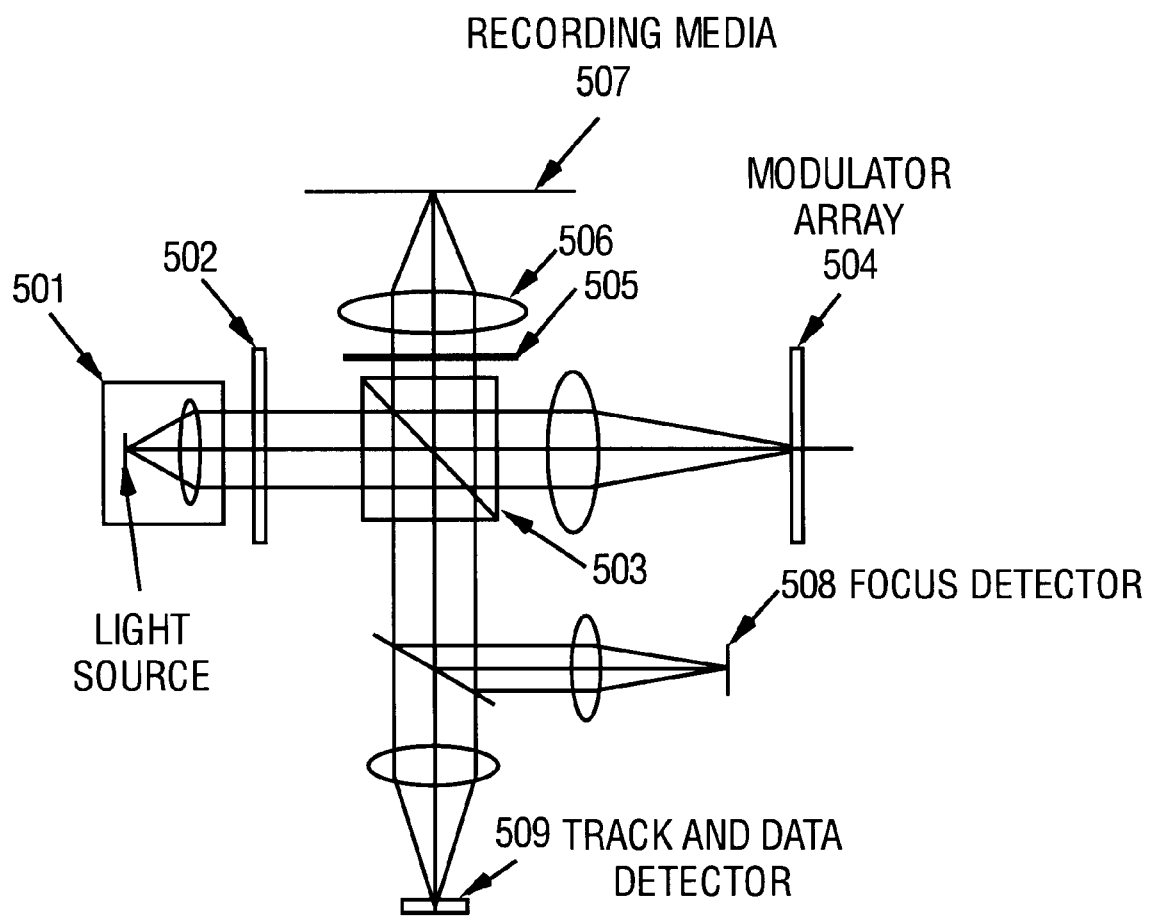
FIG. 5 shows an example of the present invention of an optical recording system having a two-dimensional modulator array using the reflective mode, to both write to an read from optical tape.

FIG. 5 shows an example of an optical recording system having a two-dimensional array using the reflective mode. A light source 501 produces a collimated light beam which is sent through hologram 502. The multiple beams of the beam array generated by hologram 502 pass through beamsplitter 503 and are modulated by the modulator array 504. In the reflective mode, the reflective PLZT modulator array 504 acts as a quarter wave plate when voltage is applied. The linearly polarized beams input through the polarizing beamsplitter 503 return from the reflective modulator array 504 and are input to the recording media 507 via quarter wave plate 505 and objective lens 506. On readback, the image from the illuminated media surface 507 is passed through the beamsplitter 503 to the focus and data detectors 508 and 509.

In the currently preferred embodiment, if any of the electronics fails, the return beams are passed straight through the beamsplitter 503. Consequently, in the event of a failure, nothing gets written to the media 507.

In digital recording systems used for storage of computer data, it is desirable to implement a means of reading the data soon after the data is written. This allows for real-time verification that the data has been properly written and can be read without error. If an error is detected, the data is flagged as being incorrect. Thereby, the data can be immediately rewritten. For this and other reasons, the data is formatted into data blocks (e.g., 64 kilobytes), wherein a block in which one or more errors are detected can be rewritten. This real-time verification/correction of the recorded data is known as "read after write".

In the currently preferred embodiment, a beam pattern which facilitates the read after write function is implemented by using a three beam laser diode. For a three source system, the center beam is used as a write beam and is located between the two other beams which are used as read beams. Either of the two adjacent read beams can be selected at the lower power for reading the data. All three beams pass through the same hologram and produce similar two-dimensional spot patterns on the media. For optical disks, one side beam is used to produce a read after write capability, while the other provides a read ahead or an erase capability if the system and media are so configured. For optical tape systems, the leading and trailing beam arrays offer the same functions in alternate directions of tape travel. The same effect can be achieved with a two beam laser by alternating the read and write beams, depending on the direction of media travel. A rectangular array is well suited for fitting the read after write beam array through the optical system.

Given eighty write and eighty read beams for a double beam array system (for a total of one hundred and sixty beams), two 9×9 arrays will optimally use the lens aperture. These two arrays can be placed one behind the other in the lens field. The lens field required for the above scenario is calculated to be 2×9×3.33 or 60 milliradians, 3.5 degrees. The required laser source separation to achieve this is nine times the interbeam angle (i.e., 9×3.33 milliradians=30 milliradians) multiplied by the focal length of the source collimation system. If this focal length is 6 mm, then the diode source must be separated by approximately 180 microns.

Thus, an apparatus and method for a two-dimensional spatial light modulation is disclosed.

What is claimed is:

1. An apparatus for generating a two dimensional array of modulated diffraction limited light beams, said apparatus comprising:

a light source for generating light;

a first lens for collimating said light into a collimated light beam;

a two dimensional holographic beam splitter through which said light beam passes, wherein said holographic beam splitter produces a two dimensional array of a plurality of diffraction limited light beams and wherein said holographic beam splitter is rotated at an angle such that beam spacings are greater than track spacings of an optical medium;

a two dimensional modulator array having discrete elements for independently modulating each of said plurality of diffraction limited light beams, wherein a plurality of modulated light beams are produced by said modulator;

a pair of relay lenses for focusing said plurality of light beams from said holographic beam splitter onto said modulator array;

an objective lens for focusing said plurality of modulated light beams onto an optical medium; and a polarized beam splitter for passing said plurality of modulated light beams to said objective lens with a pre-determined polarization.

2. The apparatus of claim 1, wherein said modulator array is comprised of discrete optical Pockels modulators.

3. The apparatus of claim 1, wherein said modulator array is comprised of a plurality of waveguides.

4. The apparatus of claim 1, wherein said modulator array is comprised of an electrode structure deposited onto an electrooptic ferroelectric ceramic layer.

5. The apparatus of claim 1, wherein said plurality of modulated light beams produced by said beam splitter is comprised of a two dimensional divergent array of diffraction limited collimated light beams.

6. The apparatus of claim 5, wherein said modulator array is in a transmissive mode.

7. The apparatus of claim 6, wherein said transmissive mode modulator array includes a transverse electric field.

8. The apparatus of claim 5, wherein said modulator array is in a reflective mode.

9. The apparatus of claim 8, wherein said reflective mode modulator array includes a transverse electric field.

10. The apparatus of claim 5, wherein said modulator array performs amplitude modulation by means of polarization rotation.

11. The apparatus of claim 5, wherein said modulator array performs phase modulation.

12. The apparatus of claim 1 further comprising a second light source, wherein said second light source is used to generate a read beam for reading data from said medium soon after said data is written.

13. The apparatus of claim 12 further comprising a third light source used to generate a second read beam, wherein a write beam is located between two read beams.

14. The apparatus of claim 1 further comprising a means for protecting against a failure, wherein said plurality of modulated light beams are passed through said polarized beam splitter without writing data to said medium when said failure occurs.

15. A method for generating a two dimensional array of modulated light beams, said method comprising the steps of:

generating a collimated light beam;

producing a two dimensional divergent array of a plurality of diffraction limited collimated light beams by passing said collimated light beam through a hologram;

independently modulating each of said plurality of diffraction limited light beams by passing said array of light beams through a two dimensional modulator array having discrete elements, producing a plurality of modulated light beams.

passing only those of said plurality of modulated light beams having a pre-determined polarization to an objective lens;

said objective lens focusing only those of said plurality of modulated light beams having said pre-determined polarization onto an optical medium;

recording digital data onto said optical medium; and rotating said hologram at an angle with respect to said optical medium such that beam spacings are greater than track spacings of said medium.

16. The method of claim 15, wherein said modulating step is performed by discrete optical Pockels modulators.

17. The method of claim 15, wherein said modulating step is performed by a plurality of waveguides.

18. The method of claim 15, wherein said modulating step is performed by an electrode structure deposited onto an electrooptic ferroelectric ceramic layer.

19. The method of claim 15, wherein said modulating step is operated in a transmissive mode.

20. The method of claim 19 further comprising the step of applying a longitudinal electric field to said modulator array.

21. The method of claim 19, further comprising the step of applying a transverse electric field to said modulator array.

22. The method of claim 15, wherein said modulating step is opened in a reflective mode.

23. The method of claim 22 further comprising the step of applying a longitudinal electric field to said modulator array.

24. The method of claim 22, further comprising the step of applying a transverse electric field to said modulator array.

25. The method of claim 15, wherein said modulator array performs amplitude modulation by means of polarization rotation.

26. The method of claim 15, wherein said modulator array performs phase modulation.

27. The method of claim 15 further comprising the step of implementing a second light source, wherein said second light source generates a read beam for reading data from said medium soon after said data is written.

28. The method of claim 27 further comprising the step of implementing a third light source to generate a second read beam, wherein a write beam is located between two read beams.

29. The method of claim 15 further comprising the steps of:

passing said plurality of modulated light beams through a polarized beam splitter without writing data to said medium when failure occurs.

30. A method for generating a two dimensional array of modulated light beams, said method comprising the steps of:

generating a collimated light beam;

producing a two dimensional divergent array of a plurality of diffraction limited collimated light beams by passing said collimated light beam through a hologram;

independently modulating each of said plurality of diffraction limited light beams by passing said array of light beams through a two dimensional modulator array having discrete elements, producing a plurality of modulated light beams; and passing said plurality of light beams through a polarized beam splitter without writing data to said medium when failure occurs.

31. The method of claim 30, wherein said modulating step is performed by discrete optical Pockels modulators.

32. The method of claim 30, wherein said modulating step is performed by a plurality of waveguides.

33. The method of claim 30, wherein said modulating step is performed by an electrode structure deposited onto an electrooptic ferroelectric ceramic layer.

34. The method of claim 30, wherein said modulating step is operated in a transmissive mode.

35. The method of claim 34 further comprising the step of applying a longitudinal electric field to said modulator array.

36. The method of claim 34, further comprising the step of applying a transverse electric field to said modulator array.

37. The method of claim 30, wherein said modulating step is operated in a reflective mode.

38. The method of claim 37 further comprising the step of applying a longitudinal electric field to said modulator array.

39. The method of claim 37, further comprising the step of applying a transverse electric field to said modulator array.

40. The method of claim 30, wherein said modulator array performs amplitude modulation by means of polarization rotation.

41. The method of claim 30, wherein said modulator array performs phase modulation.

42. The method of claim 30 further comprising the steps of:

passing only those of said plurality of modulated light beams having a pre-determined polarization to an objective lens;

said objective lens focusing only those of said plurality of modulated light beams having said pre-determined polarization onto an optical medium;

recording digital data onto said optical medium.

43. The new method of claim 42 further comprising the step of rotating said hologram at an angle with respect to said optical medium such that beam spacings are greater than track spacings of said medium.

44. The method of claim 43 further comprising the step of implementing a second light source, wherein said second light source generates a read beam for reading data from said medium soon after said data is written.

45. The method of claim 44 further comprising the step of implementing a third light source to generate a second read beam, wherein a write beam is located between two read beams.

* * * * *